United States Patent [19]
Campbell

[11] 3,731,766
[45] May 8, 1973

[54] BRAKE RIGGING FOR RAILWAY CAR TRUCKS
[75] Inventor: James A. Campbell, Berkeley, Calif.
[73] Assignee: Westinghouse Air Brake Company, Wilmerding, Pa.
[22] Filed: Feb. 24, 1972
[21] Appl. No.: 229,042

[52] U.S. Cl..................................188/52, 188/202
[51] Int. Cl........................B61h 13/20, F16d 65/66
[58] Field of Search..........................188/52, 53, 107, 188/153 R, 198, 202

[56] References Cited
UNITED STATES PATENTS

| 3,298,474 | 1/1967 | Roselius et al.....................188/52 X |
| 3,406,791 | 10/1968 | Williams..............................188/52 |
| 3,499,507 | 3/1970 | Scott et al..............................188/52 |

Primary Examiner—Duane A. Reger
Attorney—Ralph W. McIntire, Jr.

[57] ABSTRACT

A railway car truck mounted brake rigging in which a slack adjuster mounted on one of a pair of spaced apart brake beams is connected to an equalizer lever intermediate its ends which are in turn connected by push rods to the other brake beam on which is carried a single brake cylinder having its piston operatively connected to the one push rod to spread the brake beams into brake position responsive to the supply of fluid pressure to the brake cylinder. A plurality of embodiments are disclosed covering various methods of incorporating a handbrake with the brake rigging in order to provide slack adjusted handbrake operation as well as pneumatic operation without requiring that the rigging be altered significantly for use on a truck not having a handbrake connected thereto.

15 Claims, 10 Drawing Figures

Patented May 8, 1973

BRAKE RIGGING FOR RAILWAY CAR TRUCKS

BACKGROUND OF THE INVENTION

The development of modern, compact truck mounted brake apparatus for railroad cars is predicated on the fact that composition type brake shoes exhibit a higher coefficient of friction than their counterpart cast iron shoes, making it possible to obtain the desired brake forces without resorting to brake rigging employing complex lever arrangements, as commonly employed in car mounted brake apparatus, to produce the desired brake forces through mechanical advantage. One such truck mounted apparatus is disclosed in U.S. Pat. No. 2,958,398 issued Nov. 1, 1960 to George K. Newell and assigned to the assignee of the present application. The brake rigging of this prior art patent comprises two parallel brake beams movably carried by the truck side frames, each of said brake beams carrying a brake cylinder device the piston of which is connected by a push rod to the opposite brake beam so that the brake beams are moved apart in response to application of fluid pressure to the brake cylinder devices. The brake shoes carried at the ends of the brake beams are consequently brought into frictional engagement with the vehicle wheel treads to produce substantially equal brake forces at each wheel.

In an attempt to further simplify and reduce the cost of such truck mounted brake apparatus, as well as to reduce subsequent maintenance expenses, single cylinder brake riggings have been proposed, one such scheme being described in U.S. Pat. No. 3,406,791, issued Oct. 22, 1968 to Samuel L. Williams and assigned to the assignee of the present invention. This prior art arrangement employs but a single brake cylinder device mounted on one of a pair of parallel brake beams which are movably supported by the truck side frames. An equalizer lever is secured at its midpoint to the other brake beam with the respective ends of the lever being operatively connected to a pair of push rods, one of which is connected to the brake cylinder device and the other of which is connected to the first mentioned brake beam. The equalizer lever cooperates with the single brake cylinder to transmit the braking force via the separate brake beams and brake shoes carried thereby to effectively apply a braking force on the railway car wheels.

In that this latter arrangement utilizes only a single brake cylinder device as compared to the dual cylinder arrangement in the former instance, it will be apparent that the amount of piston travel required to bring the brake shoes into engagement with the wheel treads is doubled. This fact severely limits the thickness of the brake shoes used to that which will not result in accumulated rigging slack sufficient to cause piston travel to exceed a preselected critical amount as the brake shoes become worn from a new to a condemned condition. It will be appreciated, of course, that increasing piston travel increases the volume of the brake cylinder device with an attendant reduction in the equalization of fluid pressure therein by the car control valve device in a manner well known to those skilled in the art. An increase in piston travel beyond the preselected amount consequently results in inadequate brake forces on the car.

It will be recognized further that truck mounted brake apparatus using cast iron brake shoes as opposed to composition shoes as well as railroad cars of considerable load capacity require larger diameter brake cylinder devices to produce the greater braking forces necessary, thus aggravating the problem of increased brake cylinder volume and consequently low equalization pressure so that reduced rather than increased brake forces become a very real possibility where the rigging slack accumulation results in excessive brake cylinder piston travel.

Due to the fact that it is unnecessary to provide mechanical advantage in the rigging of composition type brake shoes, as previously explained, it becomes another important consideration with truck mounted brake apparatus to provide a suitable handbrake. For example, it will be noted in the previously mentioned Newell U.S. Pat. No. 2,958,398 that a special handbrake lever arrangement is shown in which sufficient mechanical advantage is provided to develop the desired handbrake force. Such mechanical advantage in the handbrake lever system, however, also amplifies the slack at the handwheel device so that excessive operation thereof is required by the trainman to bring the brake shoes into engagement with the wheels.

SUMMARY OF THE INVENTION

It is accordingly one object of the present invention to incorporate in the rigging of a single cylinder type truck mounted brake apparatus a slack adjuster device capable of compensating for wear of the brake shoes to thereby permit the use of brake shoes having a greater amount of friction material to wear before reaching a condemning limit, thereby extending the service life of the brake shoes and consequently enhancing the desirability of a single cylinder truck mounted brake apparatus.

It is another object of the invention to provide a truck mounted brake apparatus, as above, which incorporates in the rigging thereof novel means for providing a slack adjusted handbrake arrangement which produces substantially equal hand-brake forces on the opposing brake beams.

In the attainment of the above objects, a single brake cylinder device is mounted on one of a pair of substantially parallel spaced-apart brake beams which are guidably supported in channels formed in the side frames of a railway car truck. Associated with the other brake beam is an equalizer lever the ends of which are connected by push rods to the piston of the brake cylinder device and to the first mentioned brake beam, respectively. An extendable screw member associated with a slack adjuster device mounted on the other said brake beam pivotally supports the equalizer lever intermediate its ends to cause movement of the brake beams in opposite directions in response to the application of fluid pressure to the brake cylinder device, consequently bringing the brake shoes carried at the ends of the respective brake beams into engagement with the car wheels.

A sensing pin also extends from the slack adjuster intermediate the slack adjuster screw member and the push rod which is connected from the equalizer lever to the first mentioned brake beam. The end of the sensing pin is disposed in proximity with the equalizer lever for engagement therewith in response to movement of the brake beams in a brake application direction in excess of a predetermined amount to actuate the slack adjuster, which in turn advances the slack adjuster screw to compensate for rigging slack.

Several embodiments of the invention are shown for arranging a handbrake lever with the basic rigging so as to be subject to the slack adjuster action, yet in a manner which will permit use of the same rigging on a car truck not having a handbrake, it being appreciated, of course, that only one truck of each railroad car is normally provided with a handbrake.

Other objects, features and attendant advantages of the invention will be apparent from the following more detailed description when considered in light of the accompanying drawings of which:

Figure 1:
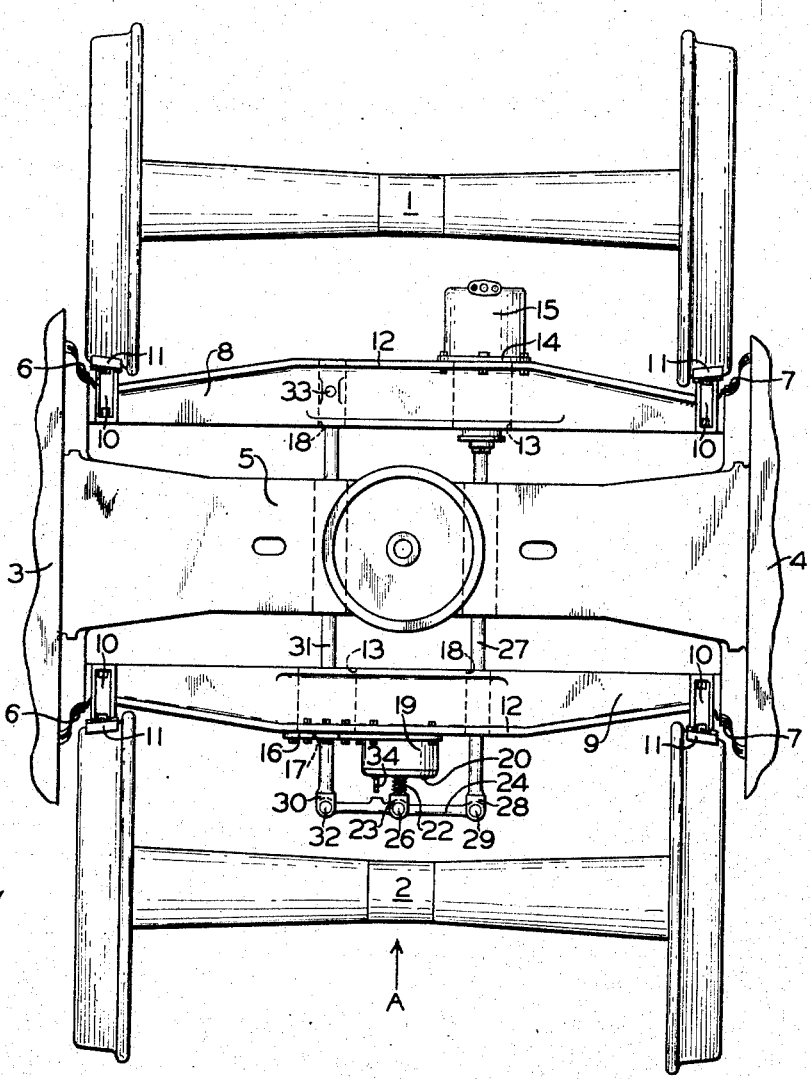
FIG. 1 is a plan view of a typical two-axle four-wheel railway car truck on which is mounted the brake rigging of the invention shown arranged with a slack adjuster device.

Referring to FIG. 1 of the drawings, a two-axle, four-wheel railway car truck is illustrated wherein adjacent wheel/axle units 1 and 2 of the truck are journalled by means, not shown, to the truck side frame members 3 and 4. The truck side frames house springs, also not shown, for supporting the bolster 5 and further include guide channels 6 and 7 arranged to receive the ends of a pair of brake beams 8 and 9 symmetrically disposed in spaced-parallel relation on opposite sides of bolster 5. These brake beams are preferably formed with brake heads 10 to which are secured in a conventional manner composition type brake shoes 11 aligned to engage the wheel treads of wheel/axle units 1 and 2, although cast iron brake shoes may alternately be used.

The cross section of brake beams 8 and 9 is generally U-shaped, with each leg portion being formed with an outturned flange 12 substantially along the length of the beam. At one side of the beam midpoint is formed a chamber or pocket 13, the opposite ends of which are open. At one end of chamber 13, flange 12 is continuous around the opening of the chamber to provide a mounting face 14. Bolted or otherwise secured to beam 8 is a corresponding flange on the pressure head of a brake cylinder device 15, the piston rod of which extends through an appropriate seal enclosing the opposite end of chamber 13 to prevent the entrance of dirt, moisture and other foreign material to the brake cylinder device. The brake cylinder piston, not shown, thus operates within the brake cylinder body in a manner more fully explained in previously mentioned prior art U.S. Pat. No. 2,958,398.

Figure 2:
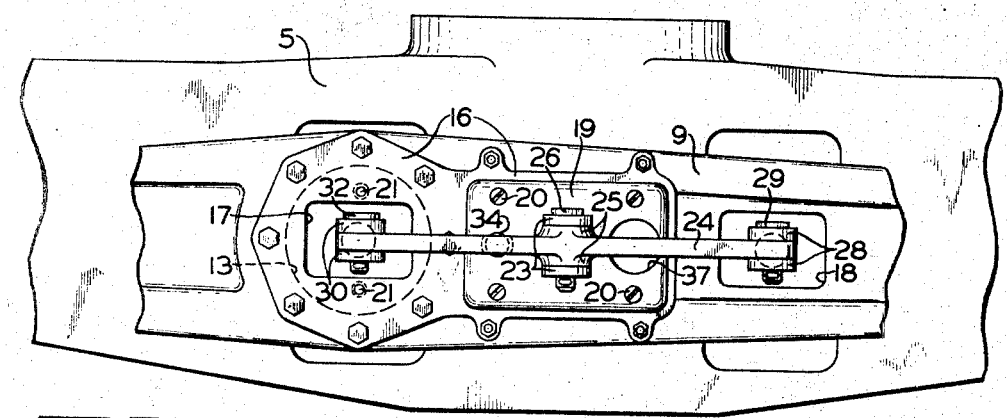
FIG. 2 is an enlarged partial elevation view of the brake rigging of FIG. 1 looking in the direction of arrow A.

Similarly secured by bolts or other suitable means to mounting face 14 of brake beam 9 is a mounting bracket 16 having an opening 17 aligned with the opening providing chamber 13, as can be seen in FIG. 2.

Each brake beam 8 and 9 is further formed with an opening 18 spaced at the opposite side of the beam midpoint a distance corresponding to the distance therefrom of opening 13. It will be apparent therefore that brake beams 8 and 9 are of identical construction and are accordingly interchangeable with one another to facilitate truck assembly, maintenance, etc.

A slack adjuster device 19 is secured to mounting bracket 16 by bolts 20 in the position shown in FIGS. 1 and 2, with additional threaded holes 21 being provided in bracket 16 to secure slack adjuster 19 thereto in a different mounting position, as hereinafter explained. Extending from slack adjuster device 19 is a screw threaded member 22 having a clevis end 23 for receiving an equalizer lever 24, the midpoint of which is formed with a boss 25 arranged to fit closely within the jaws of clevis end 23. A pin 26 pivotally secures lever 24 to clevis end 23 of member 22.

Connected to the piston of brake cylinder device 15 is a push rod 27 having a clevis end 28 which is passed through an opening provided in bolster 5 and opening 18 in beam 9, being pivotally connected by a pin 29 to one end of equalizer lever 24. The opposite end of lever 24 is similarly connected to a clevis end 30 of a push rod 31 by a pin 32. Push rod 31 passes through opening 13 and opening 17 in brake beam 9 and mounting bracket 16, respectively, for connection with brake beam 8 by a pin 33 at opening 18 of beam 8.

Also extending from slack adjuster device 19 is a sensing pin 34 the external end of which is disposed in proximity with equalizer lever 24 with which contact is made to effect slack adjuster operation, as hereinafter explained, when brake shoe wear creates rigging slack in excess of a predetermined nominal amount.

An explanation of the construction and operation of slack adjuster 19 is not deemed necessary for an understanding of the present invention except to point out that sensing pin 34 is effective in response to engagement with lever 24 to cause extension of screw member 22. While this may be accomplished in several ways, one common well known concept is that of pin 34 actuating a pawl carriage during brake applications against a spring which is effective to return the pawl carriage as the sensing pin load is removed during a brake release. A ratchet wheel having threaded engagement with screw member 22, and supported against axial movement, is rotated by the carriage pawls during return of the carriage if sufficient overtravel during a brake application has positioned the carriage pawls in a succeeding one of the teeth or notches comprising the ratchet wheel to thereby extend screw member 22 axially.

During a brake application initiated by supply of fluid pressure to brake cylinder 15, the brake cylinder pressure head mounted to brake beam 8 pulls brake beam 8 toward wheel/axle unit 1, while at the same time, the brake cylinder piston is forced in the opposite direction. Push rod 27 consequently rotates equalizer lever 24 about pin 26 and thereby transfers the brake cylinder force via push rod 31 to brake beam 8 until the brake shoes 11 encounter the wheel treads of wheel/axle unit 1. When this occurs, pin 32 connecting equalizer lever 24 to push rod 31 becomes the fulcrum point about which lever 24 is pivoted by push rod 27. Being connected by pin 26 to lever 24, screw member 22 pulls slack adjuster 19 and thus brake beams 9 into brake shoe engagement with the wheel treads of wheel/axle unit 2.

Due to the fact that the distance between pin 32 and pin 26 is greater than the distance between pin 32 and sensing pin 34, which moves with the slack adjuster 19 and thus with pin 26, it will be seen that sensing pin 34 will engage equalizing lever 24 after a predetermined amount of movement of the rigging. As brake shoe wear occurs, this predetermined amount of rigging movement will increase sufficiently to deflect sensing pin 34 enough to cause the rigging slack to be compensated by the extension of screw member 22 as the slack adjuster is operated during subsequent release of the brakes.

Figure 3:
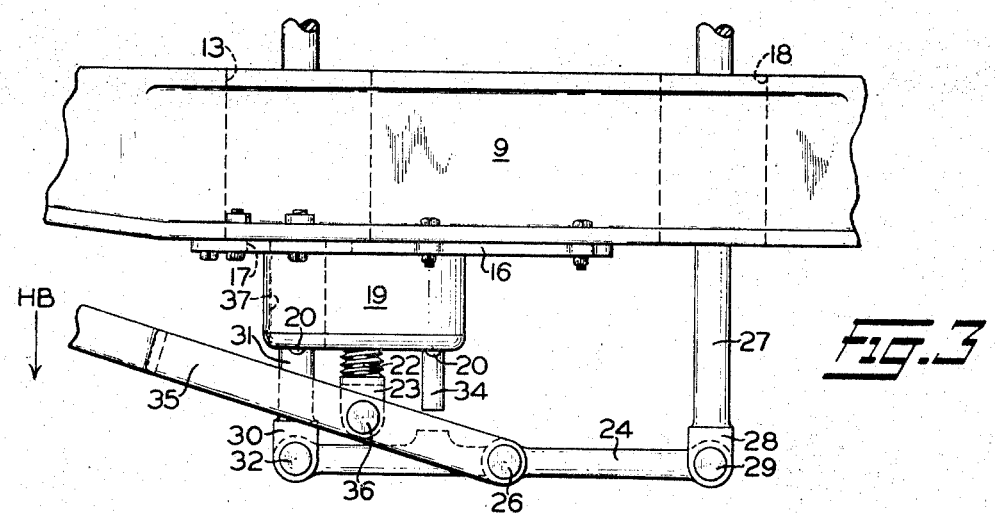
FIG. 3 is an enlarged partial plan view of the rigging of FIG. 1 modified to accommodate a handbrake by repositioning the slack adjuster device.
Figure 4:
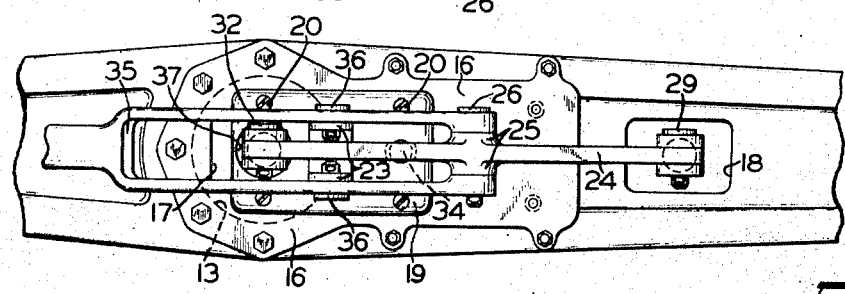
FIG. 4 is an enlarged partial elevational view of the modified brake rigging of FIG. 3 looking in the direction of arrow A of FIG. 1.

In that it is common practice to apply a handbrake to one truck of the pair of trucks comprising a railroad car, an arrangement is shown in FIG. 3 and FIG. 4 in which a handbrake lever 35 is incorporated in the rigging in such a manner as to permit slack compensated pneumatic and manually applied brake operation without unduly altering the basic configuration described. This is accomplished by simply reversing the position of slack adjuster 19 on mounting bracket 16, end-for-end and securing thereto by bolts 20 in openings 21 so that sensing pin 34 remains in the same position relative to pin 32 as before. Screw member 22, however, is situated intermediate sensing pin 34 and pin 32 where its clevis end 23 is connected by pins 36 to the handbrake lever 35, the end of which is in turn connected by pin 26 to the equalizer lever 24 at boss 25 thereof. Slack adjuster 19 may be provided with an opening 37 to accommodate passage of push rod 31 in this position of the slack adjuster.

Now in applying the brakes pneumatically, rotation of equalizer lever 24 about the fulcrum point of pin 32 subsequent to engagement of the brake shoes carried by beam 8 with the wheel treads of wheel/axle unit 1 causes handbrake lever 35 to pull screw member 22, slack adjuster 19 and brake beam 9 in the direction of brake shoe engagement with wheel/axle unit 2. The amount of this movement of brake beam 9 is the same as the amount of movement of pin 26 to which the slack adjuster clevis end 23 is in effect directly connected due to the binding action between levers 24 and 35. This binding action occurs by reason of the fact that the arc generated by pin 26 in accordance with lever 35 attempting to rotate about pin 36 is different than that generated by pin 26 in accordance with lever 24 rotating about its fulcrum point at pin 32. Consequently, screw member 22 and handbrake lever 35 between pins 36 and 26 is in effect a solid link connecting slack adjuster 20 to the midpoint of equalizer lever 24. It will thus be seen that sensing pin 34 will be effective to engage lever 24 after a predetermined amount of movement of the rigging to control slack adjuster operation in a manner similar to that previously described.

Figure 5:
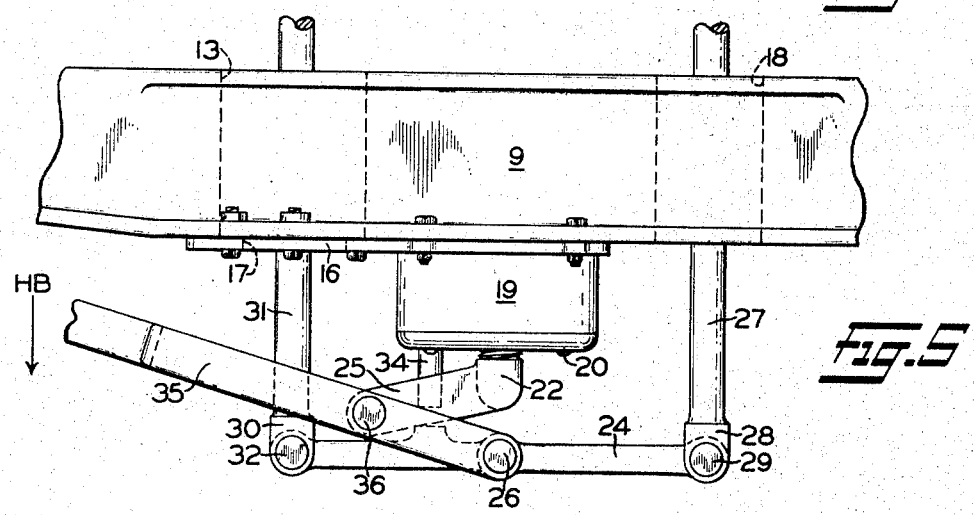
FIG. 5 through FIG. 10 show enlarged partial plan and elevation views of the rigging of FIG. 1 modified in various alternate ways to accommodate a handbrake without repositioning the slack adjuster device.
Figure 6:
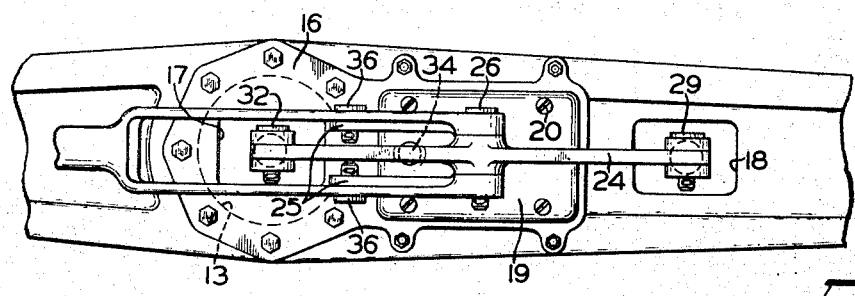

In addition, handbrake lever 35 is connected by means, not shown, to the conventional railway car handwheel which when operated to apply the brakes pulls lever 35 in the direction of arrow HB. If it is assumed for the sake of explanation that one of the brake beams, as brake beam 9, offers more resistance to movement than the other, handbrake lever 35 will fulcrum about pin 36 with the end of lever 35 connected by pin 26 to equalizer lever 24 forcing both push rods 27 and 31 and thus brake beam 8 toward brake shoe engagement with wheel/axle unit 1. When this occurs pin 26 will become the fulcrum point of lever 35 so that with continued take-up of the handwheel, lever 35 acting through its pin connection with screw member 22 will pull slack adjuster 19 and thus brake beam 9, to which the slack adjuster is connected, into brake shoe engagement with wheel/axle unit 2. It will be seen that handbrake lever 35 is bifurcated to permit its movement without interference with the rigging with which it cooperates; and since the handbrake lever is an integral part of the rigging for effecting a pneumatic brake application, it will be apparent that the slack adjuster will also maintain a relatively constant handbrake take-up.

Where it is desired to incorporate a handbrake with the brake rigging without requiring that slack adjuster 19 be disconnected from the rigging and repositioned, as above explained, an alternate arrangement shown in FIGS. 5 and 6 is provided. This arrangement simply replaces the straight screw member 22 with a screw member having an angular clevis end 25, which is connected by pins 36 to handbrake lever 35 much in the same manner as in FIGS. 3 and 4, so that the relative positions of pins 32, 36 and 26 correspond. Thus, only the relative position of slack adjuster 19 with respect to its mounting location differs from the arrangement of FIGS. 3 and 4, with the operation being likewise similar so that no further explanation is deemed necessary.

Figure 7:
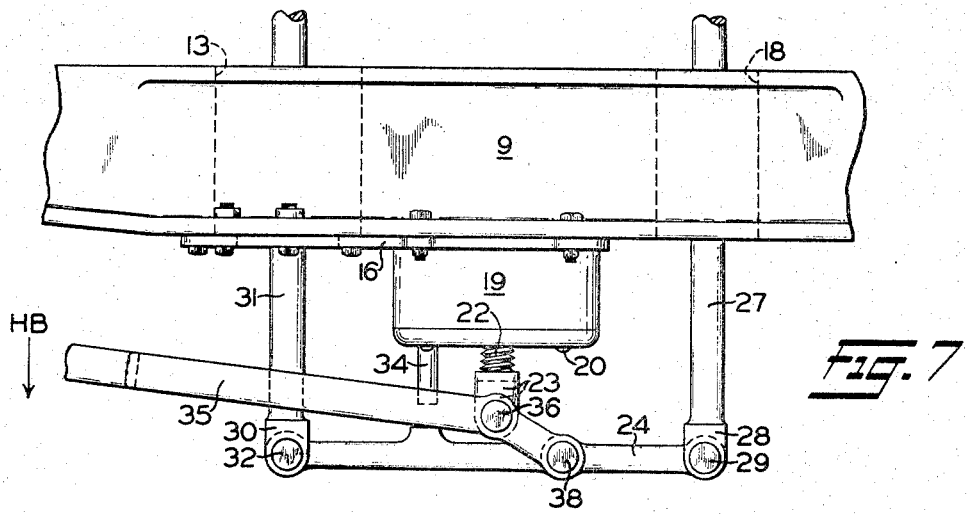
Figure 8:
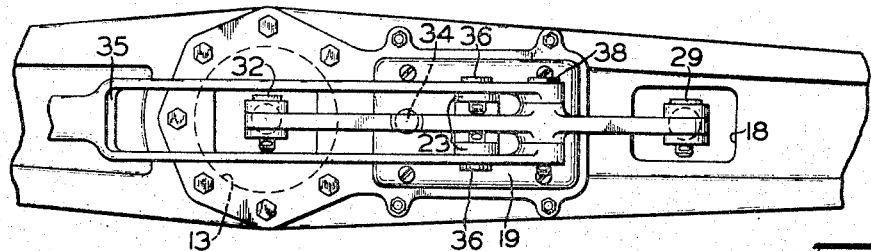

Still another embodiment of the invention is shown in FIGS. 7 and 8 which differs from the previous arrangements in that the end of handbrake lever 35 is connected by a pin 38 to the equalizer lever 24 at a point intermediate the lever mid-point and pin 29. The clevis end 23 of screw member 22 is then joined by pins 36 to the handbrake lever. This arrangement operates similar to the previous arrangements which include handbrake lever 35, but permits slack adjuster 20 to remain in its normal position, as in FIGS. 1 and 2, without requiring a screw member 22 having an angular clevis end as required in the arrangement of FIGS. 5 and 6. A different equalizer lever 24 is required, however, with boss 25 thereof being formed intermediate the lever midpoint and one end.

Figure 9:
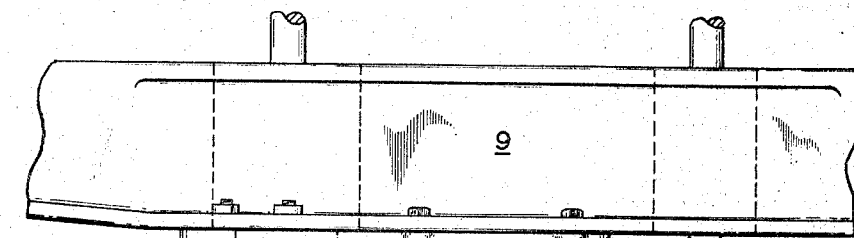
Figure 10:
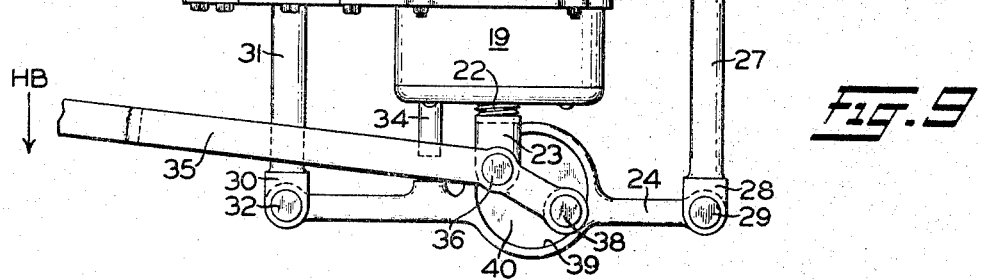
Figure 10:
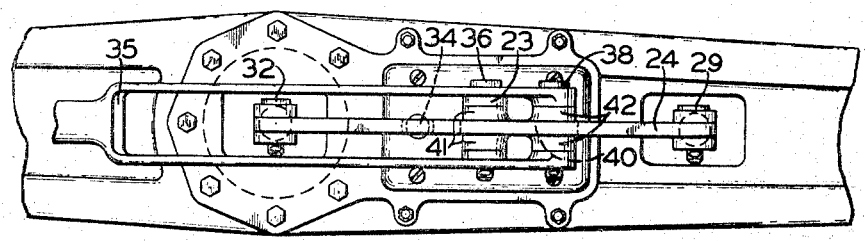

Still another embodiment of the invention is illustrated in FIGS. 9 and 10 which is similar to that of FIGS. 7 and 8 except that equalizer lever 24 is formed intermediate its ends in a circular shape having an opening 39 in which is disposed a circular disc 40, which is free to rotate in opening 39. Disc 40 includes a pair of diagonally opposed bosses 41 and 42 which fit between the screw member clevis end 23 and the end of handbrake lever 35, respectively. Pin 36 secures an intermediate point of handbrake lever 35 and clevis end 23 of screw member 22 with boss 41 so as to be eccentric with disc 40. Also, pin 38 secures the end of handbrake lever 35 with disc 40 so as to also be eccentric with the disc, said pin connections preventing rotation of disc 40 relative to handbrake lever 35.

In operation, lever 34 is fulcrumed about disc 40 in response to actuation of push rod 27 when a brake application is initiated until push rod 31 transmitting the brake force to brake beam 8 encounters resistance indicative of brake shoe contact with wheel/axle unit 1. Pin 32 then becomes the fulcrum point of lever 34, resulting in arcuate movement of disc 40 about pin 32 as push rod 27 continues to move in response to the brake application. Due to the arcuate path of pin connection 38 about pin 36 being different than its arcuate path about the fulcrum point of lever 34, handbrake lever 35 and consequently disc 40 are unable to rotate about pin connection 36, thus forcing the screw member 22 to pull slack adjuster 19 and consequently brake beam 9 with lever 24 toward brake shoe engagement with wheel/axle unit 2. Again it will be noted that sensing pin 34 moves at a rate corresponding to the rate of movement of equalizer lever 24 at a point corresponding to the center of disc 40. In that sensing pin 34 is located to contact lever 24 at a point between the center of disc 40 and pin 32 where a slower relative rate of motion of lever 24 occurs, it will be apparent that contact will, in fact, occur to operate slack adjuster 19 should excess rigging slack develop, as previously explained.

In applying the handbrake, lever 35 is actuated in the direction of arrow HB. Assuming pin 36 is the initial fulcrum point of lever 35 due to brake beam 9 offering greater resistance to movement than beam 8, disc 40 is rotated within opening 39 about eccentric 36 to force lever 24 and thus push rods 27 and 31 in a direction which forces the brake beam 8 into brake shoe engagement with wheel/axle unit 1. Further movement of lever 24 is thus prevented, with pin connection 38 becoming the fulcrum point of handbrake lever 35. Disc 40 consequently rotates about eccentric pin connection 38 as continued movement of handbrake lever 35 occurs in the direction of arrow HB, thereby pulling pin connection 35, slack adjuster 19 and brake beam 9 into brake shoe engagement with wheel/axle unit 2.

It will be appreciated from this latter arrangement that disc 40 affords a relatively large wear surface with respect to lever 24 to reduce the occasion of slack accumulation due to wear of the several pin connections comprising the brake rigging.

Having now described the invention, what I claim as new and desire to secure by Letters Patent, is:

1. A truck mounted brake rigging for a railway vehicle including a pair of brake beams having brake shoes at the ends thereof, said brake beams being disposed transverse of the longitudinal centerline of the truck, the side frames of which guidably support said beams for movement in opposite directions toward a brake application position in which the brake shoes engage the truck wheels responsive to supply of fluid pressure to a brake cylinder device carried by one of said brake beams, said rigging further comprising:
   a. piston means operable in said brake cylinder and cooperating therewith to form a pressure chamber for receiving the supply of fluid pressure to said brake cylinder whereby said piston means and said brake cylinder provide a braking force in opposite directions,
   b. a slack adjuster carried by the other one of said brake beams, said slack adjuster comprising connecting means for adjusting said brake rigging in accordance with operation of said slack adjuster responsive to movement of said rigging an amount in excess of a predetermined amount,
   c. an equalizer lever pivotally connected intermediate its ends to said connecting means,
   d. a first push rod connected between said piston means and one end of said equalizer lever,
   e. a second push rod connected between the other end of said equalizer lever and said one brake beam,
   f. said first push rod, said equalizer lever and said second push rod cooperating to transmit said brake force on said piston means to said one brake beam for cooperation with the brake force effective on said brake cylinder to produce movement of said one brake beam in one direction to a brake application position with respect to one pair of said truck wheels, and
   g. said first push rod, said equalizer lever and said connecting means cooperating, subsequent to movement of said one brake beam to its brake application position, to transmit the brake force on said piston means to said other brake beam to effect movement thereof in the other direction to a brake application position with respect to the other pair of said truck wheels.

2. A brake rigging as recited in claim 1 further characterized in that said brake cylinder and said second push rod are located with respect to said one brake beam at oppositely spaced points equidistant from said longitudinal centerline.

3. A brake rigging as recited in claim 1 wherein said slack adjuster further comprises a sensing pin arranged to engage said equalizer lever subsequent to movement of said rigging an amount exceeding said predetermined amount to thereby effect operation of said slack adjuster.

4. A brake rigging as recited in claim 3 further characterized in that said sensing pin is engageable with said equalizer lever intermediate said other end thereof and the point of connection of said connecting means therewith.

5. A brake rigging as recited in claim 1 further characterized in that said connecting means is connected to said equalizer lever at the midpoint thereof.

6. A brake rigging as recited in claim 3 wherein said slack adjuster may be alternately mounted in either a first position in which said connecting means lies on said longitudinal centerline or a second position in which said adjustable means lies to one side of said centerline.

7. A brake rigging as recited in claim 6 wherein said slack adjuster is mounted in said first position and said connecting means is connected to said equalizer lever at the midpoint thereof.

8. A brake rigging as recited in claim 6 wherein said connecting means comprises:
   a. a handbrake lever having its one end connected to said equalizer lever, and
   b. an adjustable member connected to said handbrake lever at a point intermediate the ends thereof.

9. A brake rigging as recited in claim 8 wherein said slack adjuster is mounted in said second position in which said adjustable manner is disposed intermediate said sensing pin and said other end of said equalizer lever, said one end of said handbrake lever being connected to said equalizer lever at the midpoint thereof.

10. A brake rigging as recited in claim 3 wherein said connecting means further comprises:

a. a handbrake lever having its one end connected to said equalizer lever, and b. an adjustable member connected to said handbrake lever at a point intermediate the ends thereof.

11. A brake rigging as recited in claim 10 further characterized in that said slack adjuster is mounted so that said adjustable member lies on the longitudinal centerline of said truck, an angularly disposed end being formed on said adjustable member to provide said connection thereof with said handbrake lever.

12. A brake rigging as recited in claim 10 further characterized in that said slack adjuster is mounted so that said adjustable member lies on said longitudinal centerline, said handbrake lever being connected to said equalizer lever intermediate the midpoint and one end thereof to provide for said connection of said adjustable member with said handbrake lever.

13. A brake rigging as recited in claim 10 further characterized in that said equalizer lever is formed intermediate its ends with a circular opening in which is provided a conforming disc about which said equalizer lever operates, said handbrake lever and said connecting means being connected to said disc at a point eccentric therewith to effect movement of said disc about said eccentric point when said handbrake lever is operated.

14. A brake rigging as recited in claim 13 further characterized in that said disc is provided with a first eccentric to which is connected said one end of said handbrake lever and a second eccentric diagonally opposed to said first eccentric for connection with said adjustable member and said handbrake lever at a point intermediate the ends thereof.

15. A brake rigging as recited in claim 14 wherein said slack adjuster is mounted so that said adjustable member lies on said longitudinal centerline.

* * * * *